United States Patent
Clever

(10) Patent No.: US 7,841,173 B2
(45) Date of Patent: Nov. 30, 2010

(54) CONSERVATION OF ENERGY CATALYST MONITOR

(75) Inventor: Tim J. Clever, Waterford, MI (US)

(73) Assignee: GM Global Technology Operations, Inc.

( * ) Notice: Subject to any disclaimer, the term of this patent is extended or adjusted under 35 U.S.C. 154(b) by 394 days.

(21) Appl. No.: 11/809,903

(22) Filed: Jun. 1, 2007

(65) Prior Publication Data
US 2008/0295815 A1  Dec. 4, 2008

(51) Int. Cl.
F01N 3/00 (2006.01)
(52) U.S. Cl. .............................. 60/298; 60/274; 60/277; 60/320; 60/321; 440/1; 440/88 C; 440/88 J; 440/89 R; 440/89 C; 440/89 G; 440/89 H
(58) Field of Classification Search ............... 60/276, 60/298, 320, 321, 274, 277; 440/89 B, 89 C, 440/88 K, 1, 2, 89 R, 88 G, 88 J, 89 E, 89 G, 440/89 H
See application file for complete search history.

(56) References Cited

U.S. PATENT DOCUMENTS

| 6,053,785 | A   | * | 4/2000  | Kato et al. ............... 440/89 R |
| 6,120,335 | A   | * | 9/2000  | Nakase et al. ............ 440/89 B |
| 6,478,644 | B1  | * | 11/2002 | Ozawa et al. ............. 440/89 R |
| 6,484,688 | B1  | * | 11/2002 | Strauss ...................... 123/298 |
| 6,524,150 | B2  | * | 2/2003  | Ozawa ...................... 440/88 L |
| 7,314,044 | B2  | * | 1/2008  | Westerbeke ............... 123/672 |
| 2003/0005686 | A1 | * | 1/2003 | Hartick ....................... 60/298 |
| 2007/0193564 | A1 | * | 8/2007 | Takahashi et al. ........ 123/568.2 |

* cited by examiner

*Primary Examiner*—Binh Q Tran

(57) ABSTRACT

A marine engine control system comprising a water jacket, an outlet sensor, and a control module. The water jacket directs a flow of water across a catalytic converter to cool the catalytic converter. The outlet sensor module measures an actual temperature of the water. The control module determines an expected temperature of the water when the catalytic converter is functional.

20 Claims, 3 Drawing Sheets

CONSERVATION OF ENERGY CATALYST MONITOR

FIELD

The present disclosure relates to diagnostic systems for vehicles, and more particularly to diagnostic systems for monitoring catalytic converter efficiency in water-cooled exhaust systems.

BACKGROUND

During a combustion process of an internal combustion engine, gasoline is oxidized and hydrogen (H) and carbon (C) combine with air. Various chemical compounds are formed including carbon dioxide ($CO_2$), water ($H_2O$), carbon monoxide (CO), nitrogen oxides (NOx), unburned hydrocarbons (HC), sulfur oxides (SOx), and other compounds.

A vehicle exhaust system includes a catalytic converter that reduces CO, HC, and NOx in the exhaust gas. Efficiency of the catalytic converter is periodically monitored to prevent excess CO, HC, and NOx in the exhaust gas. Typically, the catalytic converter is monitored during steady state engine operation. At idle, for example, an engine control module adjusts an air to fuel (A/F) ratio to achieve consistent emissions output.

Traditional monitoring methods force the A/F ratio to one of a lean or rich condition for a predetermined period. The control module switches the A/F ratio back to either a rich or lean condition after expiration of the predetermined period. During the predetermined period, the control module estimates an oxygen storage capacity (OSC) of the catalytic converter based on a lag time between an inlet oxygen sensor and an outlet oxygen sensor detecting the lean/rich condition. The OSC is indicative of the efficiency of the catalytic converter.

Existing catalytic converter monitoring devices and methods are not effective for use with water-cooled exhaust systems, as are typically used in marine vehicles. For example, the outlet oxygen sensor can be rendered inoperable due to a high moisture content found in marine exhaust systems.

SUMMARY

A marine engine control system comprising a water jacket, an outlet sensor, and a control module. The water jacket directs a flow of water across a catalytic converter to cool the catalytic converter. The outlet sensor module measures an actual temperature of the water. The control module determines an expected temperature of the water when the catalytic converter is functional.

In other features, the control module determines that the catalytic converter is functional when the actual temperature is within a predetermined range of the expected temperature.

In other features, the control module determines that the catalytic converter is not functional when the actual temperature is outside of a predetermined range of the expected temperature.

In other features, the control module includes an alarm module that generates a notification signal when the catalytic converter is not functional.

Further areas of applicability will become apparent from the description provided herein. It should be understood that the description and specific examples, while indicating the preferred embodiment of the invention, are intended for purposes of illustration only and are not intended to limit the scope of the invention.

DRAWINGS

The present invention will become more fully understood from the detailed description and the accompany drawings, wherein.

DETAILED DESCRIPTION

Figure 1:
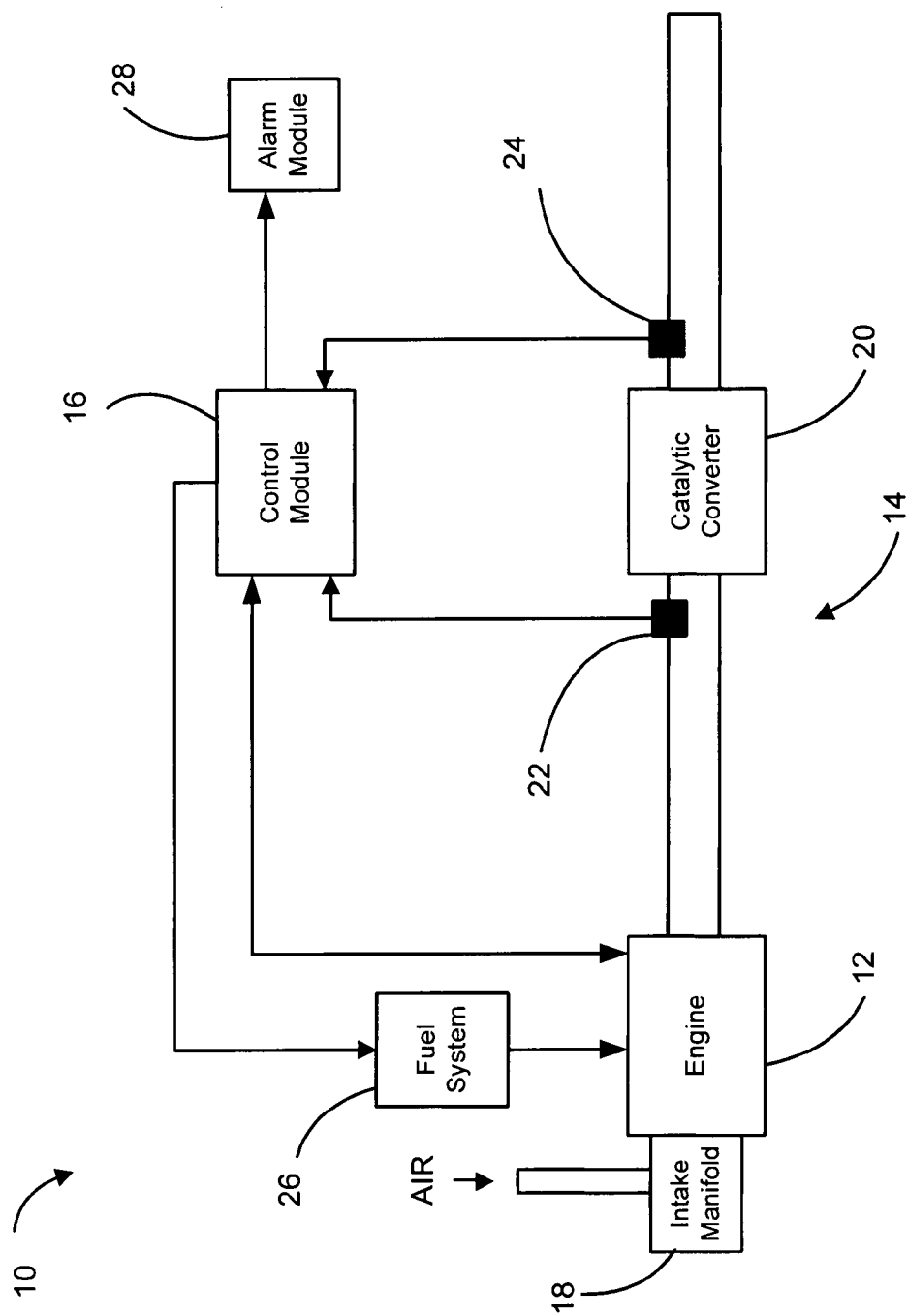
FIG. 1 is a functional block diagram illustrating an engine system according to the present teachings.

The following description is merely exemplary in nature and is not intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

With reference to FIG. 1, an engine system 10 generally includes an engine 12, an exhaust system 14, and a control module 16. Air is drawn into the engine 12 through an intake manifold 18. The air is combusted with fuel inside cylinders (not shown) of the engine 12. Exhaust produced by the combustion process exits the engine 12 through the exhaust system 14.

The exhaust system 14 includes a catalytic converter 20, that is cooled by water. The exhaust gas is treated in the catalytic converter 20 and is released. A pre-catalyst or inlet sensor module 22 is located in the exhaust system 14 between the engine 12 and the catalytic converter 20. An outlet sensor module 24 is located in the exhaust system 14 at an outlet side of the catalytic converter 20. Further description of the location of the inlet sensor module 22 and the outlet sensor module 24 is provided herein.

The inlet sensor module 22 generates signals based on the oxygen content of the exhaust gas. The signals are communicated to the control module 16. The control module 16 determines the air to fuel (A/F) ratio based on the signals. The control module 16 communicates with a fuel system 26. The fuel system 26 regulates fuel flow to the engine 12. In this manner, the control module 16 adjusts and regulates the A/F ratio to the engine 12.

The inlet sensor module 22 can include any suitable sensor that can be used to identify the oxygen content of the exhaust released by the engine 12 and the temperature of the exhaust. For example, the inlet sensor module 22 can be a heated exhaust gas oxygen (HEGO) sensor that generates a variable resistance based on the oxygen content of the exhaust. As is known to one skilled in the art, the variable resistance generated can be plotted against temperature using a standard resistance versus temperature HEGO sensor graph to identify the temperature of the exhaust. Alternatively, the inlet sensor module 22 can include two different sensors, such as one sensor that identifies the oxygen content of the exhaust and another sensor that identifies the temperature of the exhaust.

Signals generated by the inlet sensor module 22 are based on the oxygen content of the exhaust passing the inlet sensor module 22 relative to stoichiometry. The sensor signals generated by the inlet sensor module 22 oscillate back and forth between rich and lean values in an A/F ratio range that brackets the stoichiometric A/F ratio.

The control module 16 regulates fuel flow based on the signals generated by the inlet sensor module 22. For example, if the signals generated by the inlet sensor module 22 represent a lean condition, the control module 16 increases fuel flow to the engine 12. Conversely, if the signals generated by the inlet sensor module 22 indicate a rich condition, the control module 16 decreases fuel flow to the engine 12. The amount of fuel is determined based on fuel offset gains. The fuel offset gains are determined based on the signals generated by inlet sensor module 22.

The outlet sensor module 24 can include any sensor device capable of identifying the temperature of water. For example, the outlet sensor module 24 can include a coolant temperature sensor.

The engine system 10 further includes an alarm module 28. As further described herein, the control module 16 monitors the efficiency of the catalytic converter 20. In situations where the efficiency of the catalytic converter 20 is outside of predetermined parameters, the control module 16 activates the alarm module 28. The alarm module 28 can include any suitable notification device that is capable of alerting a user of the engine system 10, or a related system, that the efficiency of the catalytic converter is not at an optimum level. For example, the alarm module 28 can include a visual alarm, an audio alarm, or an electronic signal that is sent to another on-board or off-board notification system or control module. Similarly, the alarm module 28 can be used to provide an alert to a user or a related system when the catalytic converter 20 is operating within the predetermined efficiency parameters.

Figure 2:
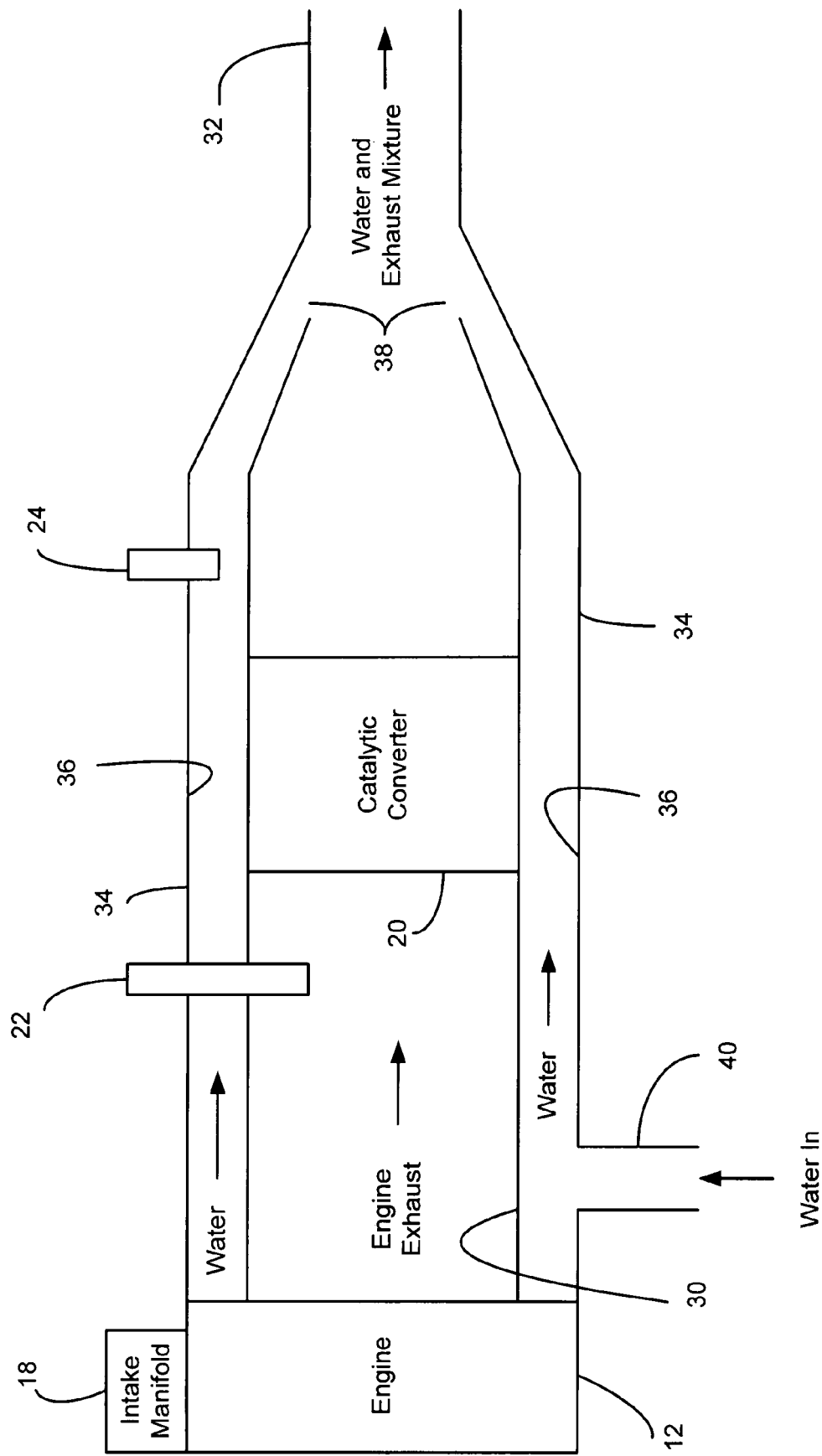
FIG. 2 is a schematic drawing of an exhaust system according to the present teachings.

With additional reference to FIG. 2, the exhaust system 14 is further described. The catalytic converter 20 is connected to the engine 12 by a first exhaust conduit 30. The first exhaust conduit 30 directs exhaust from the engine 12 to the catalytic converter 20. The inlet sensor module 22 is provided in the first exhaust conduit 30 to measure the oxygen content of the exhaust. A second exhaust conduit 32 directs exhaust away from the catalytic converter 20.

The exhaust system 14 further includes a water jacket 34. The water jacket 34 directs a flow of water for cooling the catalytic converter 20. The water jacket 34 surrounds all or a portion of the first exhaust conduit 30, the catalytic converter 20, and the second exhaust conduit 32. The water jacket 34 defines a receptacle or passageway 36 at an exterior of each of the first exhaust conduit 30, the catalytic converter 20, and a portion of the second exhaust conduit 32. The passageway 36 terminates at, or merges with, the second exhaust conduit 32 at a point 38.

The water jacket 34 includes one or more water inlet valves 40 spaced apart along the water jacket 34. The water inlet valve 40 receives and directs a flow of water to the passageway 36. Once in the passageway 36, the water is directed to flow across the first exhaust conduit 30 and the catalytic converter 20 to the second exhaust conduit 32. The water is directed to empty into the second exhaust conduit 32 at the point 38 where the passageway 36 terminates or merges with the second exhaust conduit 32.

The outlet sensor module 24 is located in the passageway 36 between the catalytic converter 20 and the point 38 where the passageway 36 merges with the second exhaust conduit 32. Thus, the outlet sensor module 24 measures the temperature of the water after the water has passed across the catalytic converter 20, but before the water is mixed with the exhaust gas at point 38.

Figure 3:
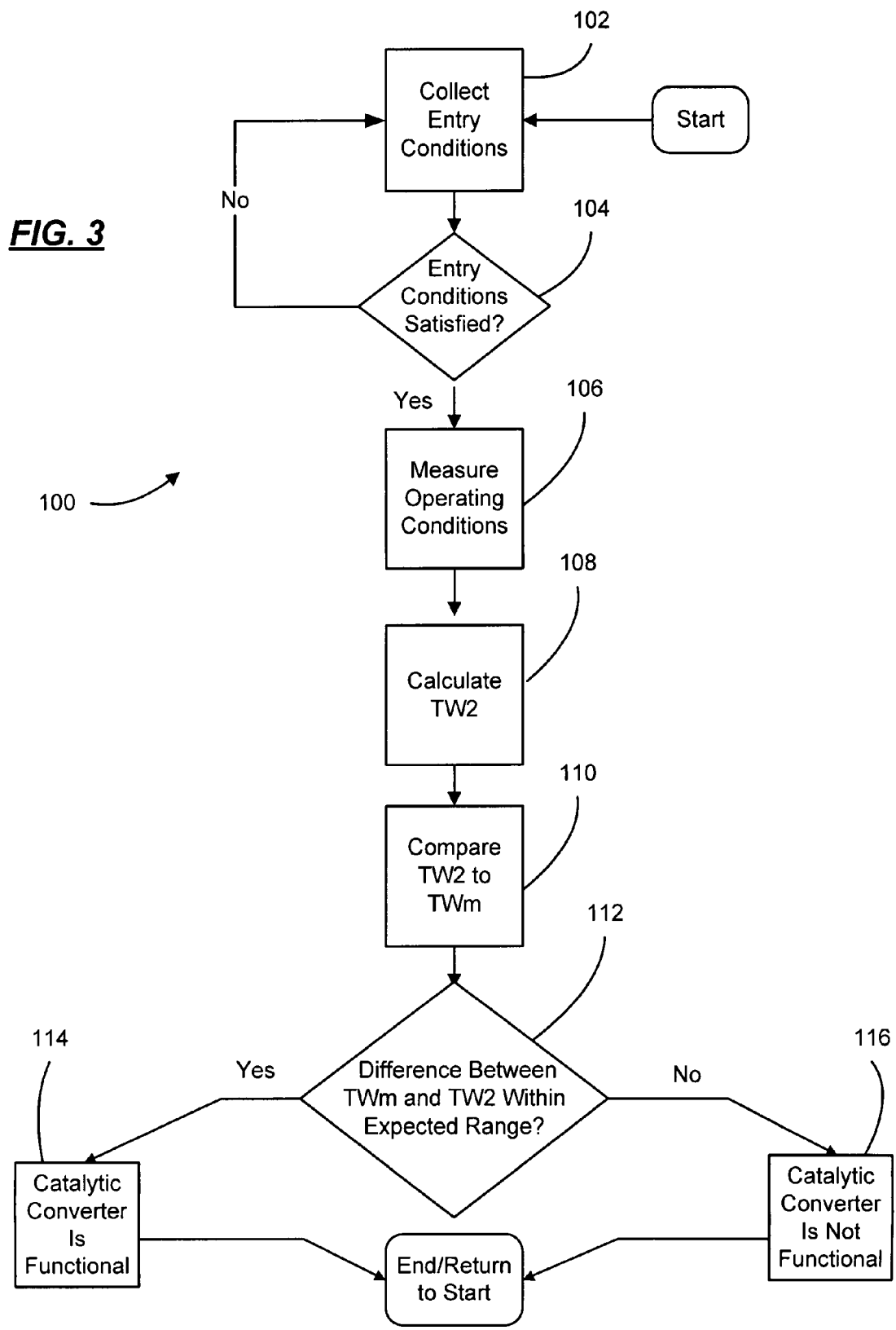
FIG. 3 is a flow chart illustrating steps executed by a control module according to the present teachings.

With additional reference to FIG. 3, a flowchart illustrating steps performed by the control module 16 for monitoring the efficiency of the catalytic converter 20 are illustrated and generally designated 100. Control begins with step 102. At step 102 the control module 16 gathers relevant entry conditions of the engine system 10. For example, the control module 16 receives inputs representative of at least the following: engine speed (RPM); engine coolant temperature; throttle position; manifold pressure; and diagnostic status. Diagnostic status refers to whether a previous diagnostic failure was identified by the control module 16 that would prevent the control module 16 from accurately monitoring the efficiency of the catalytic converter 20. If such a prior diagnostic failure occurred, then the control module 16 will refrain from monitoring the efficiency of the catalytic converter 20.

At step 104, the control module 16 determines whether the entry conditions identified at step 102 meet certain predetermined thresholds. Typically, the control module 16 will not proceed with measuring the efficiency of the catalytic converter unless the predetermined thresholds are met. For example, the control module 16 will typically only test the efficiency of the catalytic converter 20 if: the engine run time is greater than 300 seconds; the engine speed is greater than 1,500 RPM; the coolant temperature is greater than 50° C.; the throttle position is greater than 15% and stable at +/−3%; and manifold pressure is greater than 50 KPa and stabile at +/−5 KPa. If the predetermined thresholds are not satisfied, then the control module 16 will repeat step 102 until the thresholds are satisfied. If the thresholds are satisfied, then the control module 16 will proceed to step 106.

At step 106 the control module 16 measures various operating conditions of the engine system 10 in preparation for processing this information to determine the functionality of the catalytic converter 20. For example, the control module 16 measures the following: the temperature of the engine exhaust after it exits the engine 12 (TE1), but before it reaches the catalytic converter 20, which can be measured using the inlet sensor module 22; engine speed (RPM), which is detected using any suitable engine speed sensor; engine coolant temperature, which is detected using any suitable coolant temperature sensor; engine load (MAP), which is detected using any suitable engine load sensor; and the actual temperature of water ($TW_M$) present in the water jacket 34 that has passed across the catalytic converter, but has not yet mixed with the engine exhaust, as measured by the outlet sensor module 24. Further explanation as to how these different conditions are measured is set forth in the Example herein.

At step 108, the control module 16 performs a number of calculations. The calculations are further described in the Example set forth herein, to determine the expected temperature of the water ($TW_2$) in the water jacket 34 after the water has passed across the catalytic converter 20, but before the water is mixed with the engine exhaust, when the catalytic converter 20 is functional. For example, the control module 16 calculates or otherwise determines the following: the water flow rate ($M_w$) and the exhaust flow rate ($M_e$) across the catalytic converter 20; the temperature of the water ($TW_1$) before it passes across the catalytic converter 20; and the temperature of the exhaust ($TE_1$) before it passes through the catalytic converter 20. Based on the results of these calculations, the control module 16 calculates $TW_2$.

At step 110, the control module 16 compares the expected water temperature ($TW_2$) to the actual water temperature ($TW_m$) of water that has passed across the catalytic converter, but has not yet mixed with the engine exhaust.

At step 112, the control module 16 determines if the difference between the actual water temperature ($TW_m$) and the expected water temperature ($TW_2$) is within a predetermined range. The predetermined range can be determined in a variety of different ways. For example, the predetermined range can be the difference between the expected temperature of water having passed across a properly functioning catalytic converter ($TW_2$) and the expected temperature of water having passed across a non-functional catalytic converter. The expected temperature of water having passed across a non-functional catalytic converter can be calculated using the calculation for determining $TW_2$ described herein, but modified to account for the lack of heat generated by a non-functional catalytic converter. Alternatively, the predetermined range can be the difference between the expected temperature of water having passed across a properly functioning catalytic converter ($TW_2$) and a predetermined value that can be obtained through engine testing by actually measuring the water temperature that has passed across a known inert catalytic converter under a variety of engine operating conditions. Further, the predetermined range can be a predetermined value based on engine operating conditions. For exemplary purposes, a sample predetermined range of plus or minus 15° C. is used herein.

Using the exemplary predetermined range of plus/minus 15° C., if the difference between $TW_m$ and $TW_2$ of the catalytic converter 20 is less than 15° C., then the control module 16 determines that the catalytic converter is functional and/or operating at peak efficiency and will provide an appropriate feedback signal to the operator or appropriate monitoring device of the engine system 10, such as via the alarm module 28, at step 114. If the difference between $TW_m$ and $TW_2$ is greater than +/−15° C., then the control module 16 determines that the catalytic converter is not functional and/or not operating at peak efficiency and will send an appropriate feedback signal to the operator or appropriate monitoring device, such as via the alarm module 28, at step 116.

EXAMPLE

The following is an example of use of the control module 16 to monitor the efficiency of the catalytic converter 20.

As illustrated at FIG. 3, the control module 16 collects a series of entry conditions of the engine 12 at step 102. In this example, the following entry conditions are monitored: engine speed; engine coolant temperature; engine throttle position; engine manifold pressure; and diagnostic status.

At step 104, the control module 16 compares the entry conditions identified at step 102 to a predetermined set of entry conditions that insure stable operation of the catalytic converter 20 to be checked. Typical entry conditions include the following: engine run time of greater than 300 seconds; engine speed greater than 1,500 RPM; coolant temperature greater than 50° C.; throttle position greater than 15% and stable at +/−3%; and manifold pressure greater than 50 KPa and stabile at +/−5 KPa. If the entry conditions identified at step 102 satisfy the predetermined set of entry conditions, then the control module 16 will measure operating conditions at step 106 that are relevant to determining the functionality of the catalytic converter 20. If the entry conditions identified at step 104 do not satisfy the predetermined set of entry conditions, then the control module 16 will not proceed to step 106, but will rather continue to collect entry conditions at step 102 until the measured entry conditions satisfy the predetermined entry conditions.

At step 106, the control module 16 measures various operating conditions of the engine system 10. Exemplary operating conditions, along with exemplary values for each condition, are as follows: oxygen current measured by inlet sensor module 22 including a HEGO sensor=8 ohms; engine speed=3,000 RPM; coolant temperature=74° C., 347.15° K.; engine load=60 Kpa; actual temperature of water (TW1) in the water jacket 34 that has passed across the catalytic converter, but not yet mixed with engine exhaust, as measured by the outlet sensor module 24=105° C. with functional catalyst or 51° C. without functional catalyst ($TW_m$).

At step 106, the control module 16 also references and uses a number of predetermined and preprogrammed values to perform additional calculations for determining additional values, such as the following: derive the temperature of the water in the water jacket 34 before it passes across the catalytic converter 20 by plotting the oxygen resistance measured by the inlet sensor module 22, in the case where the inlet sensor module 22 includes a HEGO sensor, against the temperature of the HEGO sensor, which is determined using a standard HEGO resistance/temperature graph, to identify a temperature of 300° C., 347.15K; water temperature factor (F), which is an empirical calibration based on the engine system 10=0.95; volumetric efficiency (VE) of the engine, based on empirical calibration of RPM v. manifold absolute pressure=0.97; mass water flow (mw) based on water pump flow v. engine speed, such as 25 gal/min @ 3000 RPM=1.577 L/second; specific heat of water (Cpw)=4185 J/Kg*deg. K; specific heat for exhaust gas (Cpe)=1072 J/Kg*deg. K.; and expected exhaust temperature for given operating point based on empirical measure ($TE2e$)=315° C., 588.15K.

After measuring and identifying the engine operation conditions at step 106, the control module 16 uses these results to calculate the expected temperature of water ($TW_2$) that has passed across the catalytic converter 20, but not yet mixed with the engine exhaust at step 108 for a functioning catalytic converter. However, in order to calculate $TW_2$, the control module 16 must first calculate the mass flowrate of engine exhaust (Me) and the temperature of the water (TW1) in the water jacket 34 before the water passes across the catalytic converter 20.

In this example, Me=engine speed of 3000 Rev/Min*2 Rev/6.0 L*0.97VE*1 min/60 sec=16.167 L/sec. TW1=the coolant temperature of 74° C.*the water temperature factor (F) of 0.95=70.3° C.=343.45K.

In this example, $TW_2$ is calculated using the following equation:

$$TW_2 = (Me*Cpe/Mw*Cpw)*(TE2e-TE1)+TW1.$$ Thus,
$$TW2=((16.167\ L/sec*1072\ J/Kg*deg\ K.)/(1.577\ L/sec*4185\ J/Kg*deg\ K.))*(588.15K-573.15K))+343.35K=382.75K=109.6°\ C.$$

At step 112, the control module compares the actual temperature ($TW_m$) to the expected temperature ($TW_2$) of water that has passed across the catalytic converter, but not yet mixed with the engine exhaust, to determine if the catalytic converter 20 is functioning. If the actual temperature $TW_m$ is within 15° C., plus or minus, of the expected temperature $TW_2$ of a functioning catalytic converter 20, then the control module 16 will determine that the catalytic converter 20 is functioning and will generate a signal indicating as such at step 114. If the actual temperature $TW_m$ is greater than 15° C. plus or minus the expected temperature $TW_2$ of a functioning catalytic converter, then the control module 16 determines that the catalytic converter 20 is not functioning and will generate a signal at step 116 to notify the user or other systems and modules. The signals generated at steps 114 and 116 can be any suitable signal, such as an audio or visual signal generated by the alarm module 28.

The control module 16 can be programmed to measure the functionality of the catalytic converter 20 in predetermined time intervals to regularly monitor the functionality of the catalytic converter 20.

Those skilled in the art can now appreciate from the foregoing description that the broad teachings of the present invention can be implemented in a variety of forms. Therefore, while this invention has been described in connection with particular examples thereof, the true scope of the invention should not be so limited since other modification will become apparent to the skilled practitioner upon a study of the drawings, the specification, and the following claims.

What is claimed is:

1. A marine engine control system comprising:
a water jacket that directs a flow of water across a catalytic converter to cool the catalytic converter;
an outlet sensor module that measures an actual temperature of the water; and
a control module that determines an expected temperature of the water when the catalytic converter is functional.

2. The marine engine control system of claim 1 wherein the control module determines that the catalytic converter is functional when the actual temperature is within a predetermined range of the expected temperature.

3. The marine engine control system of claim 1 wherein the control module determines that the catalytic converter is not functional when the actual temperature is outside of a predetermined range of the expected temperature.

4. The marine engine control system of claim 3 further comprising an alarm module that generates a notification signal when the catalytic converter is not functional.

5. The marine engine control system of claim 1 further comprising:
a first exhaust conduit connecting an engine to the catalytic converter to direct engine exhaust from the engine to the catalytic converter; and
a second exhaust conduit connected to a catalytic converter to direct the engine exhaust away from the catalytic converter;
wherein the outlet sensor module includes an outlet sensor at the second exhaust conduit between the catalytic converter and a point where the water mixes with the engine exhaust.

6. The marine engine control system of claim 5 further comprising an inlet sensor module at the first exhaust conduit that includes a heat exhaust gas oxygen sensor (HEGO).

7. The marine engine control system of claim 1 wherein the control module determines the expected temperature of the water using the following equation: ((mass flow rate of engine exhaust*specific heat of the engine exhaust)/(mass flow rate of the water*specific heat of the water))*(expected temperature of the exhaust exiting the catalytic converter when the catalytic converter is functioning−temperature of the exhaust after the exhaust exits the engine but before the exhaust enters the catalytic converter)+actual temperature of the water flowing to the catalytic converter.

8. A method for determining functionality of a water cooled catalytic converter comprising:
comparing an actual temperature of water flowing from the catalytic converter and not mixed with engine exhaust to an expected temperature of the water when the catalytic converter is functional; and
determining whether the actual temperature of the water is within a predetermined range of the expected temperature of the water.

9. The method of claim 8 further comprising determining that the catalytic converter is not functional when the actual temperature is not within the predetermined range of the expected temperature.

10. The method of claim 8 further comprising determining that the catalytic converter is functional when the actual temperature is within the predetermined range of the expected temperature.

11. The method of claim 8 further comprising identifying the actual temperature of the water using a sensor module positioned on an outlet side of the catalytic converter.

12. The method of claim 8 wherein the predetermined range is 15° C. greater than and less than the actual temperature of the water.

13. The method of claim 8 further comprising collecting the following entry conditions of an engine system that the water cooled catalytic converter is associated with to determine whether to calculate the expected temperature of the water: engine speed, coolant temperature, throttle position, manifold pressure, and diagnostic status.

14. The method of claim 13 further comprising measuring the following operating conditions of the engine system to determine the expected temperature: temperature of the engine exhaust after the exhaust exits an engine, but before the exhaust reaches the catalytic converter; engine speed; engine coolant temperature; engine load; flow rate of the water; flow rate of the engine exhaust; expected temperature of the exhaust after the exhaust exits the catalytic converter.

15. The method of claim 8 wherein the expected temperature of the water is determined using the following equation: ((mass flow rate of the engine exhaust*specific heat of the engine exhaust)/(mass flow rate of the water*specific heat of the water))*(expected temperature of the exhaust exiting the catalytic converter when the catalytic converter is functional−temperature of the exhaust after the exhaust exits the engine but before the exhaust enters the catalytic converter)+actual temperature of the water flowing to the catalytic converter.

16. The method of claim 9 further comprising activating an alarm module when the catalytic converter is not functional.

17. An engine control system comprising:
a control module that determines an actual temperature of water flowing from a catalytic converter and not mixed with engine exhaust, and determines an expected temperature of the water when the catalytic converter is functioning;
wherein the control module compares the actual temperature to the expected temperature to determine when the catalytic converter is functioning.

18. The engine control system of claim 17 wherein the control module determines that the catalytic converter is functioning when the actual temperature is within a predetermined range of the expected temperature.

19. The engine control system of claim 17 further comprising an alarm module that generates a notification signal when the catalytic converter is not functioning.

20. The engine control system of claim 17 wherein the control module identifies the expected temperature of the water using the following equation: ((mass flow rate of the exhaust*specific heat of the exhaust)/(mass flow rate of the water*specific heat of the water))*(expected temperature of the exhaust exiting the catalytic converter when the catalytic converter is functioning−temperature of the exhaust after the exhaust exits the engine but before the exhaust enters the catalytic converter)+actual temperature of the water flowing to the catalytic converter.

* * * * *